US008275637B1

(12) United States Patent
Glacy, Jr. et al.

(10) Patent No.: US 8,275,637 B1
(45) Date of Patent: Sep. 25, 2012

(54) EARNINGS AT RISK METHOD AND SYSTEM

(75) Inventors: Anson J. Glacy, Jr., Evanston, IL (US);
Ronald C. Davidson, Woodstock, IL (US); Cynthia S. MacDonald, Arlington Heights, IL (US); Alan A. Schecher, Wheaton, IL (US); Kurt J. Stump, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 732 days.

(21) Appl. No.: 11/847,089

(22) Filed: Aug. 29, 2007

Related U.S. Application Data

(63) Continuation of application No. 11/743,224, filed on May 2, 2007, now abandoned.

(60) Provisional application No. 60/746,224, filed on May 2, 2006.

(51) Int. Cl.
*G06Q 40/00* (2012.01)
(52) U.S. Cl. ..... 705/4; 703/3; 705/7; 705/26; 705/36 R; 705/38; 705/39
(58) Field of Classification Search ........... 705/4, 35–45
See application file for complete search history.

(56) References Cited

U.S. PATENT DOCUMENTS

| 7,340,433 | B1 * | 3/2008 | Kay et al. ..................... 705/38 |
| 7,467,102 | B2 * | 12/2008 | Barsness et al. ............ 705/26.1 |
| 7,469,227 | B2 * | 12/2008 | Breeden et al. ............. 705/36 R |
| 2002/0004778 | A1 * | 1/2002 | Torii ............................. 705/38 |
| 2002/0184141 | A1 * | 12/2002 | Stein et al. ................... 705/38 |
| 2004/0044505 | A1 * | 3/2004 | Horwitz ........................ 703/3 |
| 2004/0128174 | A1 * | 7/2004 | Feldman ....................... 705/7 |
| 2005/0177487 | A1 * | 8/2005 | Stein et al. ................... 705/38 |
| 2005/0251475 | A1 * | 11/2005 | Sato ............................. 705/39 |
| 2006/0143115 | A1 * | 6/2006 | Eder ............................. 705/38 |
| 2006/0184449 | A1 * | 8/2006 | Eder ............................. 705/38 |

FOREIGN PATENT DOCUMENTS

WO  WO 00/52555  * 9/2000

OTHER PUBLICATIONS

Reichert, Alan, The Potential for Portfolio Diversification in Financial Services. Economic Review. 2000. pp. 1-35.*
O'Connor, "Modeling VA Guarantees Incorporating Derivatives Based Hedging", pp. 1-9, Society of Actuaries, Spring Meeting, Session #77, New Orleans, LA, May 24, 2005.
Smith, "Variable Annuity Guarantees Modeling: Incorporating Derivative Based Hedging", pp. 1-9, Society of Actuaries, Spring Meeting, Session #77, New Orleans, LA, May 24, 2005.
French et al., "Real Time Reality the Case for Fundamental Change", Tradecraft, Mar./Apr. 2005, pp. 84-88.

(Continued)

*Primary Examiner* — Robert R Niquette
(74) *Attorney, Agent, or Firm* — Banner & Witcoff, Ltd.

(57) ABSTRACT

A method and system for determining and optimizing an insurance company's asset-liability risk is disclosed. The method and system comprises determining numerous earnings at risk (EaR) estimates to assess risks associated with asset and liability portfolios. EaR estimates may be determined through modeling of various risk factors. The EaR calculations may be processed through a distributed processing infrastructure to maximize efficiency and cycle time.

9 Claims, 6 Drawing Sheets

OTHER PUBLICATIONS

Williams et al., "Alm Solutions: Looking to the Future", Financial Insights, Mar. 2005, pp. 1-22.

Panko, "Calculating scenarios: new risk-based capital requirements are changing how variable annuity writers understand risks; Variable Annuities", Best's Review, Section: No. 8, vol. 105; p. 98 (pp. 1-10), Dec. 1, 2004.

Harasym, "Stochastic Modeling in the Financial Reporting World", Society of Actuaries, Spring Meeting, Session #68, Washington, DC, May 29-30, 2003, pp. 1-18.

* cited by examiner

| Scenario Number | Projection Step | 3-year Treasury | 10-year Treasury | 20-year Treasury | 30-year Treasury | Inflation Rate | GDP Growth Rate |
|---|---|---|---|---|---|---|---|
| 1 | 0 | 0.03690 | 0.04000 | 0.04350 | 0.04260 | 0.04400 | 0.03800 |
| 1 | 1 | 0.03108 | 0.03610 | 0.03943 | 0.03884 | 0.00658 | 0.00869 |
| 1 | 2 | 0.02504 | 0.03234 | 0.03629 | 0.03616 | 0.02366 | 0.00521 |
| 1 | 3 | 0.03067 | 0.03837 | 0.04226 | 0.04203 | 0.04224 | 0.02639 |
| 1 | 4 | 0.03544 | 0.04174 | 0.04521 | 0.04516 | 0.02715 | 0.07135 |
| 1 | 5 | 0.04158 | 0.04240 | 0.04533 | 0.04499 | 0.01429 | 0.06653 |
| 1 | 6 | 0.04521 | 0.04452 | 0.04678 | 0.04628 | 0.00894 | 0.04688 |
| 1 | 7 | 0.03347 | 0.03647 | 0.04008 | 0.03965 | 0.00700 | 0.03143 |
| 1 | 8 | 0.03464 | 0.03968 | 0.04377 | 0.04339 | 0.02842 | -0.00570 |
| 1 | 9 | 0.04259 | 0.04411 | 0.04778 | 0.04765 | 0.01928 | 0.05676 |
| 1 | 10 | 0.04100 | 0.04473 | 0.04807 | 0.04748 | 0.00600 | 0.03087 |
| 1 | 11 | 0.03850 | 0.04488 | 0.04889 | 0.04835 | 0.05778 | 0.03934 |
| 1 | 12 | 0.03131 | 0.04037 | 0.04555 | 0.04575 | 0.01410 | 0.02832 |
| scenarios 2 to 99 | 0 to 12 steps per scenario | | | | | | |
| 100 | 12 | 0.03925 | 0.04483 | 0.04603 | 0.04581 | 0.01388 | 0.03232 |

Figure 3

EARNINGS AT RISK METHOD AND SYSTEM

This application is a continuation of co-pending U.S. application Ser. No. 11/743,224, filed May 2, 2007, which claims priority to provisional U.S. Application No. 60/746,224, filed May 2, 2006, the disclosures and contents of which are hereby incorporated by reference in their entirety.

FIELD OF THE INVENTION

The present invention relates to determining earnings at risk (EaR) estimates for use in asset-liability portfolio management. More particularly, the invention relates to modeling risks associated with an insurance company's balance sheet through calculation of a multitude of earnings at risk (EaR) estimates.

BACKGROUND

Asset-liability management is a process in which a company manages risks associated with a company's balance sheet. One tool used to manage risk is the calculation of EaR metrics. EaR is a concise measure of downside risk that may be defined as an assessment of risk that measures expected loss of earnings over a specified time horizon with a defined level of confidence. EaR may be expressed as an amount of forecasted earnings that is subject to low-probability, high-severity risk. For example, a company may estimate its EaR to be $47 million of GAAP net income (GNI) for a three-year period with a 5% probability. As the example illustrates, a basic expression of EaR would include an amount ($47 million), an earnings metric (GNI), a time horizon (three years), and a probability (5%).

EaR estimation for life insurance companies is an emerging practice that presents challenges of complexity that exceed those of the banking industry, for which EaR estimation is a relatively common and mature practice. In particular, the liabilities of life insurance companies are more complex than those of the banking industry and require approaches to modeling and scenario analysis that are more sophisticated than prior approaches in either industry. These liabilities may represent in-part the diverse product mix offered by insurance companies. For instance, a life insurance company may offer insurance products including term insurance, whole life insurance, universal life insurance (UL), and single-premium life insurance (SPL). In addition, fixed annuity products may be offered such as single-premium deferred annuity (SPDA), flexible-premium deferred annuity (FPDA), market value adjusted annuity (MVAA), equity-indexed annuity (EIA), treasury-linked fixed annuity (T-Link), and single-premium immediate annuity (SPIA). Moreover, an insurance company may also offer additional products such as variable annuities (VAs), guaranteed income contracts (GICs), medium-term notes (MTNs), structured settlements, and annuity buyouts (ABOs).

Therefore, there is a need in the art for a method and system for determining EaR estimates for insurance companies and similar entities to assist in managing risks associated with asset and liability portfolios. The system and method must provide results that are easily interpreted and useful to asset-liability risk managers.

SUMMARY

Aspects of the present invention overcome problems and limitations of the prior art by providing a method of determining EaR estimates associated with an insurance company's asset-liability risk. In an aspect of the invention, a method for modeling risk may include receiving market data from at least one external source. Asset and policy data may also be received from at least one internal source. An economic scenario generator may calculate at least one economic scenario. Based on the calculated economic scenario, processing instructions may be generated. A distributed computing environment may be used to calculate earnings forecasts based on an economic scenario. The earnings forecasts may be used to generate EaR estimates. The calculated EaR estimates may be displayed for reporting and analysis.

Various modeling factors and combinations of modeling factors may be used to determine the EaR for an insurance company's balance sheet. In certain embodiments of the invention, the present invention can be partially or wholly implemented with a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3 illustrates exemplary output from an economic scenario generator module in accordance with an aspect of the invention.

DETAILED DESCRIPTION

Exemplary Operating Environment

Figure 1:
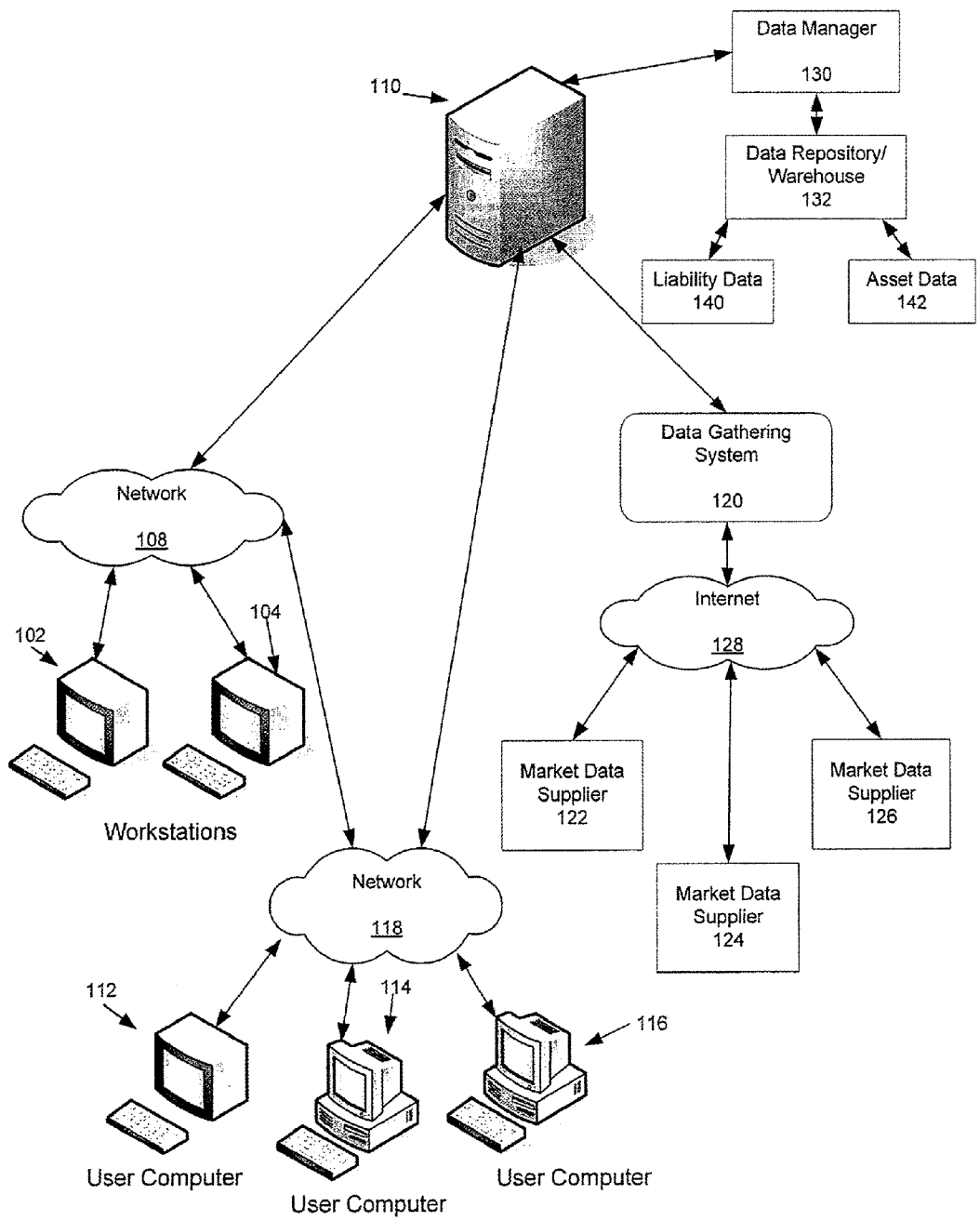
FIG. 1 shows a diagram of a computer system that may be used to implement aspects of the invention.

FIG. 1 shows a diagram of a computer system that may be used to implement aspects of the invention. A plurality of computers, such as workstations 102 and 104, may be coupled to user computers 112, 114 and 116 via networks 108 and 118. User computers 112, 114, and 116 may also be coupled to modeling computer 110. Modeling computer 110 may include various modules for executing model algorithms in accordance with various aspects of the invention. In contrast, in another aspect of the invention, various modules may be executed on user computers 112, 114, 116 and/or workstations 102 and 104.

One or more of the computers shown in FIG. 1 may include a variety of interface units and drives for reading and writing data or files. One skilled in the art will appreciate that networks 108, 118 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet 128. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

In an aspect of the invention, modeling computer 110 may require information from external sources to calculate EaR estimates. Requests for such information may be transmitted via modeling computer 110 to a data gathering system 120. Data gathering system 120 may include a processor, memory and other conventional computer components and may be programmed with computer-executable instructions to communicate with other computer devices. Data gathering system 120 may access external sources of information such as market data from market data suppliers 122, 124 and 126 via Internet 128. Market data suppliers 122-126 may include government agencies and/or private entities that provide financial data via data subscriptions or non-subscriptions services.

Modeling computer 110 may be programmed with computer-executable instructions to retrieve liability and asset data. In an aspect of the invention, modeling computer 110 may be coupled to a data manager computer device 130 that accesses liability 140 and asset data 142 stored in a data repository or data warehouse 132. In an embodiment of the invention, all data gathered may be stored in data repository 132 so that when additional requests are made for the same data, the data may quickly be obtained without requesting it from market data suppliers 122-126. Data repository 132 may be implemented with a group of networked server computers or other storage devices.

Exemplary Embodiments

Figure 2:
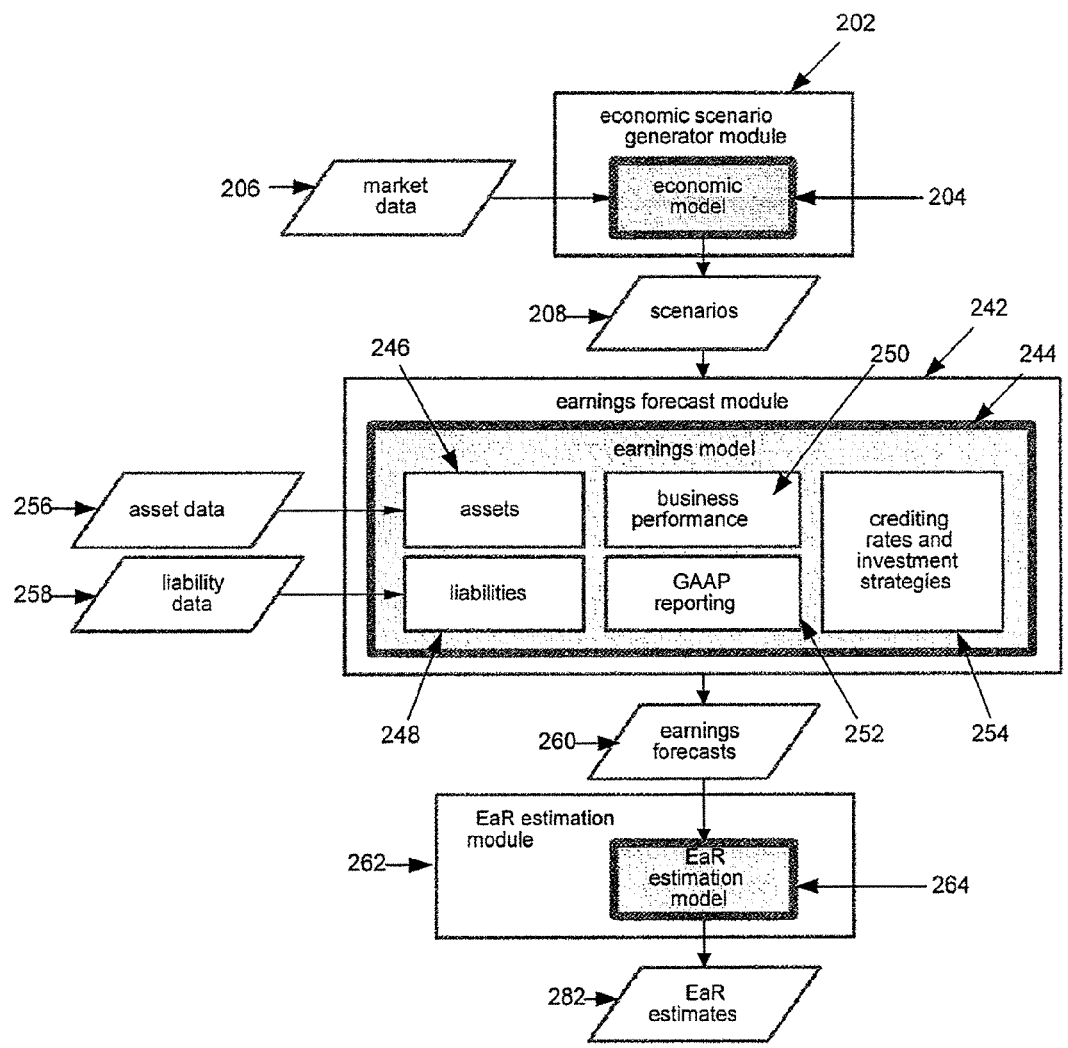
FIG. 2 illustrates a collection of computer modules that may be implemented to calculate EaR estimates in accordance with various aspects of the invention.

In accordance with various aspects of the invention, FIG. 2 illustrates various modules and inputs to modules for determining EaR estimates. The modules may include an economic scenario generator module 202, an earnings forecast module 242, and an EaR estimation module 262.

EaR estimates 282 calculated in the various aspects of the invention may be used by an insurance company to assist in making various risk management decisions such as 1) adjusting asset mix by buying or selling certain types of investment instruments; 2) adjusting liability (product) mix by changing factors such as pricing, underwriting rules, sales goals, marketing programs, or product designs; and/or 3) transferring risk through reinsurance or capitalization.

As discussed above, various modules may be executed on modeling computer 110 or on the other computing devices such as those described in FIG. 1. In FIG. 2, an economic scenario generator module 202 may create a number of scenarios 208 to be analyzed. The economic scenario generator module 202 may include an economic model 204 to predict behavior and interactions of economic indicators in each generated scenario 208. The economic model 204 may utilize market data 206 to predict future behavior of the economic indicators. The scenarios 208 may include stochastic input showing how key economic indicators may change over time.

In FIG. 3, a table 300 showing a portion of 100 scenarios 302 is shown. Those skilled in the art will realize that 100 scenarios 302 are only exemplary and that the number of scenarios that may be used may be orders of magnitude greater. For example, a more typical number of scenarios that may be used may range from 10,000 to 100,000 depending on the requirements of the EaR analysis and the capacity and performance of the computer system to operate the earnings forecast module 242.

Each scenario such as scenario 1 (304) may have multiple projection steps 305. In the exemplary illustration, thirteen projection steps are provided for each of the 100 scenarios 302. Each of the thirteen projection steps 305 may represent points in time at which the economic scenario generator module 202 creates a snapshot of the economic indicators. Projection step zero 306 may represent the current state and is established by market data used as input to economic model 204. The market data typically comprises current values for each indicator in the economic model 204, but in some aspects of the invention historical values may also be utilized. The remaining twelve projection steps 307 for scenario 1 (304) may represent calendar quarters, making the time horizon in this example three years. Those skilled in the art will realize that the time frame for analysis may be much shorter such as a single day or may include several years or longer.

In FIG. 3, six economic indicators are illustrated including four United States Treasury note durations (3 year 308, 10 year 310, 20 year 312, and 30 year 314) the U.S. inflation rate 316 and the U.S. gross domestic product (GDP) growth rate 318. The economic scenario generator module 202 may use any number and variety of economic indicators depending on which indicators are required by earnings model 244. Moreover, if products such as equity-indexed annuities (EIAs) and variable annuities (VAs) are part of the balance sheet then economic indicators indicating equity returns, interest rates, and credit spreads may also be utilized. Furthermore, for products such as guaranteed income contracts (GICs), medium-term notes (MTNs), structured settlements, and annuity buyouts (ABOs), economic indicators indicating credit spreads and interest rates may also be utilized.

Table 1 illustrates exemplary economic indicators or market data 206 that may be used as input to the economic scenario generator module 202.

TABLE 1

| | |
|---|---|
| 3-month Treasury | S&P 400 MidCap |
| 6-month Treasury | German Market Index (USD) |
| 1-year Treasury | French Market Index (USD) |
| 2-year Treasury | United Kingdom Market Index (USD) |
| 3-year Treasury | Japanese Market Index (USD) |
| 4-year Treasury | 2-year Bond Fund |
| 5-year Treasury | 5-year Bond Fund |
| 6-year Treasury | 7-year Bond Fund |
| 7-year Treasury | 10-year Bond Fund |
| 8-year Treasury | 30-year Bond Fund |
| 9-year Treasury | Money Market Fund Return |
| 10-year Treasury | User-defined Index Return 1 |
| 20-year Treasury | User-defined Index Return 2 |
| 30-year Treasury | AA Credit Spread |

TABLE 1-continued

| | |
|---|---|
| Inflation rate | A Credit Spread |
| GDP Growth Rate | BBB Credit Spread |
| S&P 500 | BB Credit Spread |
| NASDAQ | B Credit Spread |
| Dow Jones Industrial Average | CCC Credit Spread |
| Russell 2000 | |

Other examples of economic indicators or market data 206 that may be used as input to the economic scenario generator module 202 include individual stock prices, currency rates, unemployment rates, and real estate pricing indicators. As those skilled in the art will realize, numerous different indicators may be used depending on the economic scenario modeling being used to determine EaR estimates.

Figure 4:
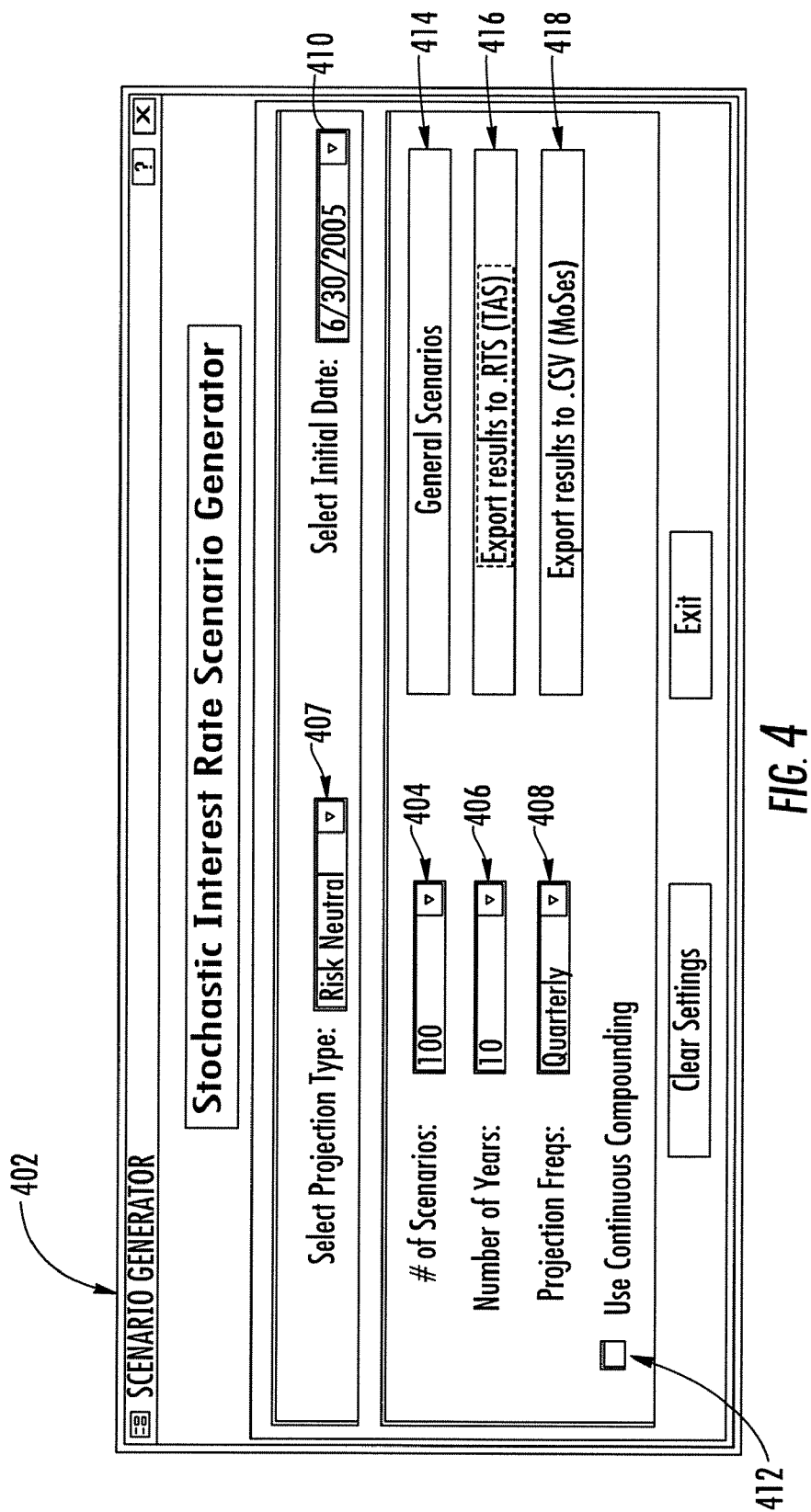
FIG. 4 illustrates an exemplary user interface screen enabling a user to select criteria for use in the economic generator module in accordance with an aspect of the invention.

FIG. 4 illustrates an exemplary graphical user interface window 402 that may be used to generate a set of scenarios 208 using economic scenario generator module 202 in accordance with an aspect of the invention. In FIG. 4, a user may select the number of scenarios 404 to be generated. The number of economic scenarios that is suitable depends on the requirements of the earnings forecast model that will use the scenarios. The maximum number of scenarios that is feasible depends largely on the computer processing capacity and performance available for the earnings forecast module to analyze the scenarios. A suitable number of scenarios may be determined by running tests to determine how many scenarios are required to show a suitable degree of convergence in the results without exceeding a suitable level of computing resource usage.

In addition to the number of scenarios 404, the user may select in FIG. 4 the number of years 406, projection type 407, and projection frequency 408 starting at a selected initial date 410. The user also may have the option to use continuous compounding 412 in the calculations. The user may generate and display the scenarios by selecting the generate scenarios button 414. As an alternative, the user may export the scenarios directly to other modules (such as earnings forecast module 242) or other analysis tools through exports buttons 416 or 418.

Returning to FIG. 2, the generated scenarios 208 may be inputted into earnings forecast module 242. The earnings forecast module 242 may be used to forecast earnings for each of the generated scenarios 208. Moreover, the earnings forecast module 242 may prepare and generate instructions to be executed by a distributed computing management module across multiple processors for calculation. The earnings forecast module 242 may compile model inputs and prepare scenario generator scripts.

In an aspect of the invention, earnings forecast module 242 may include one or more earnings models such as earnings model 244. Earnings model 244 may utilize scenarios 208 generated by economic scenario generator module 202 to assess the potential effect on a company's asset-liability portfolio and earnings. Earnings model 244 may forecast earnings for each scenario 208 based on the model's view of how assets, liabilities, and other factors will respond to changes in economic indicators and each other.

In an aspect of the invention, risks in one or more product lines, business units, regions, distribution channels, etc. may be evaluated. Moreover, in an alternative aspect of the invention, risks across an entire enterprise may be evaluated. In an embodiment, earnings forecast module 242 may comprise a model for each product line. However, for particular product lines multiple earnings forecast models may be used to represent different views of the particular product line. For example, a product line may be represented by a set of models that correspond to a combination of business units and/or regions. An earnings forecast model associated with this product line may combine outputs of multiple models to calculate totals for the product line across business units and regions. However, earnings forecast module 242 may include functionality that allows it to manage different views of a product line without requiring separate models for each view.

In an aspect of the invention, earnings forecast module 242 may support two general groups of models: standard models which may run on a regular schedule and ad hoc models which may be custom-built and run based on user demand. Standard models may be used to produce standardized reports that may be used by users at regular intervals. Ad hoc models may be used to perform customized analysis and reporting for particular research type projects.

Earnings model 244 may include various components such as an assets component 246, a liabilities component 248, a business performance component 250, a GAAP reporting component 252, and a crediting rates and investment strategies component 254.

The assets component 246 may receive asset data 256 from various company internal and external sources. The asset component 246 may include a summary of a company's asset portfolio. The earnings model 244 may forecast the performance of an asset portfolio contained in the asset component 246 for each of the scenarios 208 created by the economic scenario generator module 202. In addition, earnings model 244 may also forecast changes in the asset portfolio as changes occur to other factors such as a liability portfolio and/or the investment environment.

The earnings model 244 may comprise a collection of models or sub-models for different asset classes. However, for ease of illustration the following description refers to a single earnings model 244. Table 2 listed below includes exemplary asset data elements that may be considered by earnings model 244 when considering assets in asset component 246.

TABLE 2

Amortization Period - Months
Amortization Period - Years
Asset Allocation - 12-Month Dollar Cost Averaging Fund
Asset Allocation - 6-Month Dollar Cost Averaging Fund
Asset Allocation - Balanced Fund
Asset Allocation - Bond Fund
Asset Allocation - Fixed Account
Asset Allocation - Money Market Fund
Asset Allocation - Specialty Fund
Asset Allocation - Stock Fund
Asset Category Code
Asset Class
Asset Investment Frequency
Asset New Types
Asset Prorata
Asset Purpose
Asset Purpose Type Code
Asset Rating
Asset Risk Factor
Asset Sales Strategy
Asset to Treasury Spread
Asset Type Code
Asset Units Held
B Bond First Parameter Default
B Bond Second Parameter Default
BA Bond First Parameter Default
BA Bond Second Parameter Default
BA Bond Stochastic Default Distribution Type
BAA Bond First Parameter Default
BAA Bond Second Parameter Default
BAA Bond Stochastic Default Distribution Type TABLE 2-continued Bond Account Value
Bond Commencement Period
Bond Default Type
Bond FRN Float A Variable
Bond FRN Float B Variable
Bond FRN Float Rate Benchmark
Bond FRN Frequency
Bond Issue Price Amount
Bond Market Value by Priority Class
Bond Next Reset Date
Bond Put Schedule
Book Value Amount
Book Value Forecast Type
Book Yield
Book Yield Multiple
Book Yield Percent
BP Change for Equity - Maximum
BP Change for Equity - Minimum
BP Change for Interest Rates - Maximum
BP Change for Interest Rates - Minimum
C Bond First Parameter Default
C Bond Second Parameter Default
C Bond Stochastic Default Distribution Type
Call Schedule
Call Date
Call Price Amount
Call Price Definition Code
Call Schedule Filename
Call Tolerance
Call Type Code
Capital Gains Amount
CapLink Yield Curve Type
Collateral Payment Frequency
Collateral Payment Frequency Code
Collateral Rate Per Payment Period
Collateral Term
Cost Basis Amount
Coupon Frequency
Coupon Rate Per Payment Period
Credit Curve Addition
Credit Curves Indicator
Credit Rating Code
Current Single Rating Number
CUSIP Number
Disinvestment Market Value by Priority Class
Disinvestment Market Value by Priority Class
across each asset class (Bond, SEC, LAM)
Disinvestment Market Value to be sold for each priority class
Disinvestment Percent to Sell
Disinvestment Use Class Priority
Dividend Yield
Earnings Forecast Module Asset Class
Earnings Forecast Module Asset Group
Earnings Forecast Module Asset Record Number
Earnings Forecast Module Priority
Effective Maturity
Expiry Period
First Payment Date
Fix Rate
Fix Side Payment Frequency
Float Side Payment Frequency
GAAP Calculation Category
Index
Index Value
Inflation Multiple
Inflation Spread
Initial Asset Adjustment Type
Initial Crediting Reference Rate
Initial Face Value
Interest Amount
Interest Cap Rate
Interest Contract Payment Timing Code
Interest Only Period - Months
Interest Only Period - Years
Interest Rate Derivatives Effective Date
Interest Rate Derivatives Option Date
Interest Rate Derivatives Sale Threshold
Interest Rate Derivatives Start Period
Interest Rate Floor
Interest Rate on fixed rate policy loans
Interest/Principal Code
Lag
LAM Default Type
Last Call/Put Period
Lattice Steps per Year
Loan ID
Loan Interest Rate Setting Method
Loan Interest Spread
Loan to Value Ratio
Maturity Future Time Period
Maturity Term Due Period
Maximum Adjustable Rate
Maximum Adjustable Rate Reset Decrease
Maximum Adjustable Rate Reset Increase
Maximum Spread Below Market Rate
Minimum Adjustable Rate
Minimum Cap Rate
Money Market Account Value
Monthly Crediting Rate
Months From Last Coupon
Months Since Issue Period
Months to Expiry
Mortgage Issue Year
Mortgage Prepayment Premium Definition
Mortgage Prepayment Schedule
Mortgage Principal at Issue Amount
Mortgage Rate
Mortgage Rate Reset Frequency
New Asset Layer Adjustment
New Asset Purchase Percent
New Bond Coupon Multiplier
New Bond Layer Purchase Number
New Bond Number
New Bond Types Number
New Equity Amount
New Equity EDIM Discount Rate
New Equity Identifier
New Equity Layer Purchase Number
New Equity Maturity
New Equity Number
New Equity Option Type
New Equity Product/Security Code
New Equity Types Number
New Index Identifier
New Interest Rate Derivatives Number
New Interest Rate Derivatives Types Number
New LAM Layer Purchase Number
New LAM Number
New LAM Types Number
New SEC Layer Purchase Number
New SEC Number
New SEC Types Number
New Term Years
Next Call Date Period
Next Coupon Date Period
Next Pay Side Payment Period
Next Put/Sink Period
Next Receive Side Payment Period
Notional Amortization Amount
Notional Amortization Date
Notional Principal Amount
Number Call Spreads
Number of Equity Volume Curves
Number of Interest Rate Derivatives Volume Curves
Option Cost - Accrual Start
Option Cost - Current
Option Type
Outstanding Balances
Par Value Amount
Pay Side Float A
Pay Side Float B
Pay Side Interest Rate
Pay Side Payment Frequency
Pay Side Reference Rate Type
Pay Side Reset Frequency
Pay Side Type
Payment Timing Type
Premium Bond Proxy
Premium Frequency
Premium Interest Rate Derivatives proxy TABLE 2-continued Premium LAM Proxy
Premium SEC Proxy
Prepayment Bracket 1
Prepayment Bracket 2
Prepayment Bracket 3
Prepayment Bracket 4
Prepayment Bracket 5
Prepayment Bracket 6
Prepayment Bracket 7
Prepayment Curve Coefficient 1
Prepayment Curve Coefficient 2
Prepayment Curve Coefficient 3
Prepayment Curve Coefficient 4
Prepayment Curve Coefficient 5
Prepayment Curve Coefficient 6
Prepayment Curve Coefficient 7
Prepayment Lockout Period - Months
Prepayment Lockout Period - Years
Prepayment Method
Prepayment Penalty Percentage
Prepayment Penalty Period - Months
Prepayment Penalty Period - Years
Prepayment Setting
Prepayment Speed
Prepayment Type
Principal Value Amount
Principal Current
Product Type
Projected 10 Year Treasury Rate
Projected 3 Year Treasury Rate
Projected 5 Year Treasury Rate
Projected 7 Year Treasury Rate
Projected 90 Day Treasury Rate
Proxy Rate Index ID
Proxy Rate Index Name
Public Securities Association Prepayment Benchmark
Put Date
Put Period Months
Put Price Amount
Put Price Schedule
Put Schedule File Name
Put Tolerance
Put Type Code
Rate Change Type
Receive Side Float A Indicator
Receive Side Float B
Receive Side Interest Rate
Receive Side Payment Frequency
Receive Side Reference Rate Type
Receive Side Reset Frequency
Receive Side Type
Recovery Rate
Refinance Rate Proxy Type
Refinance Spread
Regular Pay Amount - Gross
Regular Pay Amount - Net
S&P 500 Value at Projection Start Date
Scaling
SEC Market Value by Priority Class
Security Coupon Change Date
Security Coupon Rate
Security Default Type
Security Issue Date
Security Issuer
Security Market Value Amount
Security Maturity Date
Security Original Term
Security Remaining Term
Security Sales Classification
Security Sell Date
Service Margin Number
Shape
Sink Amount
Sink Date
Sink Price
Sinking Fund Schedule
Sinking Fund Schedule File Name
Slide Number
Speed Type
Spline Change
Spread to Treasury
Standard Bond Proxy
Standard LAM Proxy
Standard SEC Proxy
Stock Account Value
Strike Price
Strike Rate
Swap Curve Simulation Spread Over Treasuries
Swap Length
Swaption Interest Rate Derivatives Proxy
Swaption Volatility Guess
Time Zero Premium
Tranche Identifier
Underlying Index Price Level
Unit Par Value Stream
Unit Par Value Stream (including defaults)
Weighted Average Book Yield Amount
Weiner Process
Year Quarter Period
Yield Benchmark
Yield Maintenance Spread
Yield Term In addition to and as an example of the asset data elements that may be considered by earnings model 244, two factors are now discussed. Prepayment and credit drift and default risk may be useful in calculating EaR estimates for life insurance companies. Prepayments refer to the forecasting of risk related to prepayments of mortgages and other asset-backed securities. Credit drift and default risk refer to the forecasting of how credit ratings of bond issuers in the asset portfolio may change over time. The credit ratings of bond issuers may affect the value of their bonds and may indicate which bond issuers may default. Regarding credit drift and default risk, if the earnings model 244 determines that a bond holding would be sold in a given scenario (for example, in accordance with modeling of investment strategy), the earnings model 244 may forecast the value of the bond at that point in time. If a bond issuer defaults in a scenario, the earnings model 244 may estimate the recovery value. Modeling of credit drift and default risk typically focuses on corporate bonds, which are more susceptible to drift and default than municipal bonds or other bond types.

The liabilities component 248 of earnings model 244 may forecast changes in a liability portfolio including costs and risks of liabilities and likely adjustments to the portfolio by management as a scenario unfolds. Earnings model 244 may use liability data 258 which includes data about liabilities in force and actuarial assumptions about future changes to the portfolio either through external forces (such as customer mortality and choices) and internal management decisions. Data about liabilities in force may include a variety of data elements related to policies and product lines. Table 3 listed below includes exemplary data elements related to policies used in accordance with various aspects of the invention.

TABLE 3

12 Month Dollar Cost Averaging Account Value
12b1 Fee Amount
12b1 Fee Percent
6 Month Dollar Cost Averaging Account Value
Account Split of Premium
Account Value Amount
Account Value Rebalance Frequency
Account Value Rebalance Indicator
Accumulated Deferred Expense Allowance
Accumulated Deferred Expenses
Accumulated GAAP Gross Profit
Administration Fee Amount

TABLE 3-continued

Administration Fee Per Unit
Age Definition
Age Last Birthday
Age Since Issue
Amortization Discount Rate
Annual premium at valuation date
Annuitization Multiplier Number
Attained Age - Life1
Attained Age - Life2
Balanced Fund Account Value
Bonus Interest Rate
Current Credited Rate
Current Credited Rate
Distribution Channel
Dollar Cost Averaging Account Value
Dump In premium for Var Prem Pols
EEDB Accumulated charges
EIA Minimum Participation Rate
EIA Participation Rate
EIA Policy Term
Elapsed Months
Endowment Age
Face Amount per Unit
First Policy Period Time Span
Fixed Account Value
Fixed Annuitization Expense
Fixed Death Expense
Fixed Expense on Lapse
Fixed Initial Expense
Fixed Premium Expense
Fixed Premium Renewal Expense
Fixed Renewal Expense
Fixed Surrender Expense
Flat Charge Rate - Life 1
Flat Charge Rate - Life 2
Flat Extra Charge Period 1
Flat Extra Charge Period 2
G2 Current Premium
Gender Indicator
GMWB Accumulated Charges
GMWB Base Value
Gross WD
Guarantee Period
Guaranteed Minimum Accumulation Benefit Accumulated Charges
Guaranteed Minimum Accumulation Benefit Amount
Guaranteed Minimum Accumulation Benefit Base Value
Guaranteed Minimum Accumulation Benefit Rider Charge
Guaranteed Minimum Death Benefit Death Claims Amount
Guaranteed Minimum Death Benefit Valuation Ratchet
Guaranteed Minimum Death Benefit Valuation Reset
Guaranteed Minimum Death Benefit Valuation Rollup
Guaranteed Minimum Income Benefit Accumulated Charges
Guaranteed Minimum Income Benefit Annuity Payment Frequency
Guaranteed Minimum Income Benefit Elapsed Months
Guaranteed Minimum Income Benefit Rider Charge
Guaranteed Minimum Income Benefit ROP Maximum Age
Guaranteed Minimum Income Benefit Valuation Ratchet
Guaranteed Minimum Income Benefit Valuation Rollup
Guaranteed Minimum Income Benefit Waiting Period
Initial AVR Balance
Initial Commission Above Target Premium Age
Initial Credited Rate
Initial Crediting Guarantee Period
Initial Excess Interest Credits
Initial Expense Allowance
Initial Expenses as % of Initial Commission
Initial Per Unit Premium
Initial Units Number
Insurance Company Initial Expenses for Premium Above TP
Insurance Company Initial Expenses for Premium Up to TP
Insurance Company Percent of Fund Load
Insurance Company Underwriting Method
Interest Cap Rate at Beginning of Current Policy Term
Issue Age
Issue Age - Exact
Issue Block Type
Issue Month
Issue Year
Joint Life Status
Liabilities Cash Flow Earnings Basis
Maturity Month
Minimum Premium Policy Fee
Non Forfeiture Current Amount
Policies In Force - Current
Policy Commencement Month
Policy Number
Policy Term
Policy Type
Premium Maximum Age
Premium Mode
Premium Paid Prior to Valuation Date
Premium Payment Term
Premium Tax Rate
Premium Type
Projected IMR Indicator
Record Number
Smoker Status Code
Specialty Account Value
Substandard Rating - Life 1
Substandard Rating - Life 2
Tier Group
Total Accumulated Free Partial Withdrawal
Total Dollar Cost Averaging Fund Premium Allocation
Total Free Partial Withdrawal - Current Policy Year
Turnover
Underwriting Class - life 1
Underwriting Class - life 2

Table 4 listed below includes exemplary product data elements used in accordance with various aspects of the invention.

TABLE 4

Distribution Channel
Book Value Calculation Frequency
Commission First Age Breakpoint
Commission First Renewal Age
Commission Last Renewal Age
Commission Second Age Breakpoint
Commission Third Age Breakpoint
Commissions Responsibility Period
Front End Charge Percent
Group Names
Group Number
Guaranteed Minimum Accumulation Benefit Period
Guaranteed Minimum Accumulation Benefit Maturity Frequency
Guaranteed Minimum Accumulation Benefit Reset Wait Period
Guaranteed Minimum Death Benefit Rollup Maximum Age
Guaranteed Minimum Death Benefit Rollup Rate
Guaranteed Minimum Death Benefit ROP Maximum Age
Plan Identification Code
Product Code
Product Line Description
Product Line Name
Product Tier In addition to the data elements related to policies and product lines, actuarial assumptions about future changes to the liability portfolio may also be used in earnings model 244. The actuarial assumptions may consist of business rules such as "if, then" statements or more complex logic algorithms. The actuarial assumptions may include data relating to mortality rates, lapse rates, partial withdrawal rate, utilization of certain benefits, customer behavior (such as anticipated persistency or lapse rates, policy loan usage, or premium additions), insurance regulations, reserving, future product definitions, and attributes (expenses, fees, surrender charges, or guarantees). In addition, earnings model 244 may also make assumptions relating to acquisition expenses and/or maintenance expenses. In another aspect of the invention, instead of making assumptions about one or more of these factors, earnings model 244 may use dynamic modeling. The use of dynamic modeling may be accomplished in earnings model 244 or through another model (similar to the interaction between the earnings model and the economic model and scenario generator). For example, instead of making assumptions about mortality, a separate model may be used to generate stochastic scenarios for mortality that may be used individually or in aggregate as input to liability modeling.

Earnings model 244 may also include a business performance component 250. Business performance component 250 may include forecasts of sales, profits, and other business performance metrics. The forecasts may be based on current sales plans, projections of the current portfolio, or similar information. The forecasts may remain static for the time horizon of a scenario or they may be adjusted dynamically through modeling of how decision-makers would respond to different scenarios.

Moreover, earnings model 244 may also include a generally accepted accounting principles (GAAP) reporting component 252. The GAAP reporting component 252 may be used to estimate earnings metrics in compliance with GAAP standards such as Financial Accounting Standards Board (FASB) Statements 91, 97, and 133, and Emerging Issues Task Force (EITF) Issue 99-20.

Earnings model 244 may also include a crediting rates and investment strategies component 254. Earnings model 244 may account for how decision-makers may adjust an asset portfolio in response to changes in the liability portfolio, particularly in terms of changes to crediting rates (the interest rate offered in annuities or other investment-type insurance products). For example, if a scenario triggers a decision to sell more fixed annuities, it may also trigger a change in investment strategy and the mix of asset classes in the asset portfolio. Furthermore, earnings model 244 may model investment strategies simply and statically, or it may model them based on principles that allow the simulated decision-makers to adapt dynamically to varying conditions such as changes in business performance and the investment environment.

In an exemplary embodiment of the invention, earnings model 244 may account for many aspects of assets, liabilities, and other factors that affect earnings. In an illustrative example, earnings model 244 may use the following combination of factors: asset portfolio performance, liability portfolio performance, asset-backed security prepayment risk, credit drift and bond default risk, crediting rates and investment strategy decisions, business performance, and GAAP results. Earnings model 244 may consider various interactions among these factors. For example, using these factors it may be determined that over a period of calendar quarters an asset class will decline in value. The asset class may be comprised of corporate bonds. In this case, it is determined that some holding may become more risky (a certain corporate bond may default). Modeling of such a scenario may trigger a simulated management decision to change the asset mix by selling the riskier bonds and purchasing a set of asset-backed securities.

The output of earnings forecast module 242 in the form of earnings forecasts 260 may be inputted to EaR estimation module 262. The EaR estimation module 262 may include an EaR estimation model 264. The EaR estimation model 264 may be used to analyze all scenarios and, based on the distribution of their earnings impact, estimate EaR 282. In addition to producing one or more key metrics that express EaR, the EaR estimation model 264 may produce one or more reports that illustrate EaR metrics and supporting detail. The reports may include quantitative data, qualitative descriptions, and visual graphs. Those skilled in the art will realize that the calculated EaR estimates 282 may be displayed in numerous formats to assist management in interpreting the results.

Figure 5:
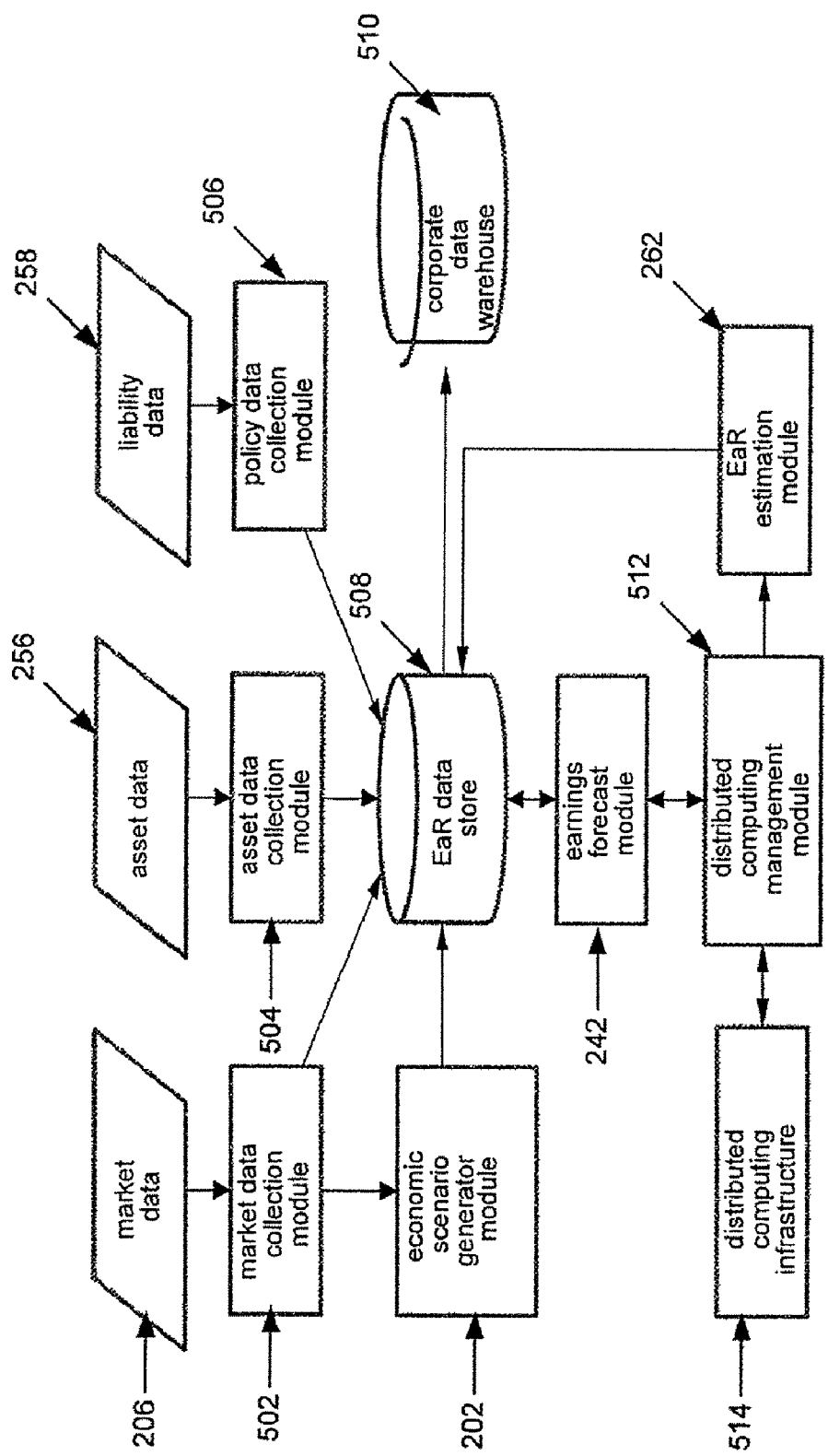
FIG. 5 illustrates an alternative collection of computer modules that may be implemented to calculate EaR estimates in accordance with various aspects of the invention.

FIG. 5 illustrates another aspect of the invention in which various other modules may be utilized. In FIG. 5, a market data collection module 502 may be used to collect market data 206 which may be inputted into economic scenario generator module 202. The market data collection module 502 may collect market data 206 from one or more internal or external sources. In addition, the collected market data 206 may be stored in EaR data store 508 for future use without the need to recollect the market data 206. Market data collection module 502 may directly work in combination with data gatherings system 120 (FIG. 1) to contact market data suppliers 122-126 and retrieve requested information.

Similar to market data collection module 502, an asset data collection module 504 and a policy data collection module 506 may also be utilized. The asset collection module 504 may collect asset data 256 regarding a company's asset portfolio to be analyzed. Policy data collection module 506 may collect liability data 258 regarding liabilities or policies held by a company. Both the asset data collected 256 and the liability data collected 258 may be stored in an EaR data store 508 for current and future processing. Moreover, data may also be stored and retrieved from a corporate data warehouse 510 which may or may not be centrally located. The corporate data warehouse 510 may be similar to the data repository warehouse 132 of FIG. 1 and may work together with a data manager 130 to store and receive requested data.

In accordance with another aspect of the invention, a distributed computing management module 512 may be used to collect processing instructions generated by earnings forecast module 242. The distributed computing management module 242 may manage the processing of tasks over a distributed computing infrastructure 514 which may comprise multiple processing units to maximize efficiency and cycle time. The distributed computing management module 512 may utilize grid computing in order to calculate earnings forecasts 260. The distributed computing infrastructure 514 may comprise networks of computers as illustrated in FIG. 1.

Figure 6:
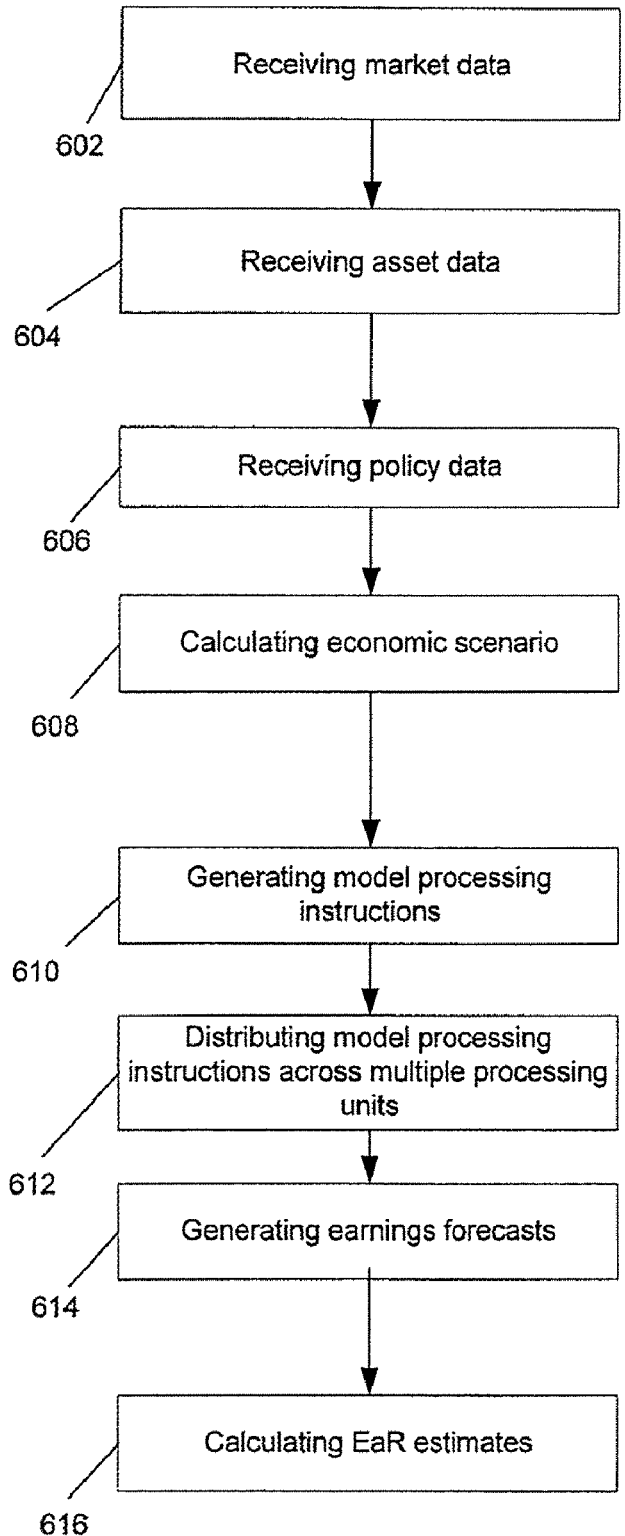
FIG. 6 illustrates a method of determining EaR estimates in accordance with an aspect of the invention.

FIG. 6 illustrates a method of modeling risks associated with a life insurance company's balance sheet in accordance with an aspect of the invention. In step 602, market data 206 may be received from at least one external source. The external source may be supplied by a market data supplier 122. Next, in step 604 asset data 256 from at least one internal source may be received. The asset data 256 may include data such as prepayment data and credit drift data. In step 606, policy data or liability data 258 may be received from at least one internal source. The policy data 258 may include elements relating to both policies and product lines. Next, in step 608 at least one economic scenario is calculated. The economic scenario may be calculated by economic scenario generator module 202.

In step 610, model processing instructions may be generated based on the calculated at least one economic scenario. The processing instructions may be distributed to multiple processing units across a distributed computing environment in step 612. The results of the processing units may be collected to generate earnings forecasts in step 614. In step 616, EaR estimates may be calculated and displayed for analysis.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A method of modeling risk, the method comprising:
   (a) receiving, at a risk modeling computer, market data from at least one external source;
   (b) receiving, at the risk modeling computer, asset data from at least one internal source;
   (c) receiving, at the risk modeling computer, policy data from the at least one internal source;
   (d) using a first processor of the risk modeling computer, calculating at least one economic scenario;
   (e) using the first processor, generating processing instructions based on the calculated at least one economic scenario;
   (f) distributing the generated processing instructions across multiple second processors;
   (g) calculating earnings forecasts based on the distributed processing instructions, wherein the multiple second processors use grid computing to calculate the earnings forecasts;
   (h) using the first processor, calculating earnings at risk forecasts, wherein the earnings at risk forecasts are calculated using credit drift and default risk factors; and
   (i) using a display screen associated with the risk modeling computer, displaying the calculated earnings at risk forecasts.

2. The method of claim 1, wherein (d) further includes calculating at least two economic scenarios.

3. The method of claim 2, wherein the calculated at least two economic scenarios are used in different risk modeling modules.

4. The method of claim 1, wherein the market data comprises capital market data.

5. The method of claim 1, further including (j) using the first processor, generating earnings at risk forecast reports.

6. A non-transitory computer-readable medium having computer-readable instructions for performing steps comprising:
   (a) receiving market data from at least one external source;
   (b) receiving asset data from at least one internal source;
   (c) receiving policy data from the at least one internal source;
   (d) calculating at least one economic scenario;
   (e) generating processing instructions based on the calculated at least one economic scenario;
   (f) distributing the generated processing instructions across multiple processors;
   (g) calculating earnings forecasts based on the distributed processing instructions, wherein the multiple processors use grid computing to calculate the earnings forecasts;
   (h) calculating earnings at risk forecasts, wherein the earnings at risk forecasts are calculated using credit drift and default risk factors; and
   (i) generating earnings at risk reports.

7. The computer-readable medium of claim 6, wherein the earnings at risk forecasts are further calculated using a prepayment risk factor.

8. The computer-readable medium of claim 6, wherein the earnings at risk forecasts are further calculated using equity market risk data.

9. The computer-readable medium of claim 6, wherein the earnings at risk forecasts are further calculated using extension risk data.

* * * * *

UNITED STATES PATENT AND TRADEMARK OFFICE
CERTIFICATE OF CORRECTION

PATENT NO. : 8,275,637 B1
APPLICATION NO. : 11/847089
DATED : September 25, 2012
INVENTOR(S) : Anson J. Glacy, Jr.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this
Seventeenth Day of March, 2020

Andrei Iancu
*Director of the United States Patent and Trademark Office*